3,236,781
LUMINESCENT CERAMIC MATERIAL OF CADMIUM, BORON, AND MANGANOUS OXIDES
Frank Veres, Toledo, Ohio, assignor to Owens-Illinois Glass Company, a corporation of Ohio
No Drawing. Filed Aug. 13, 1962, Ser. No. 216,292
3 Claims. (Cl. 252—301.6)

The present invention relates to new glasses and to luminescent materials therefrom. In one aspect the invention relates to a method of making colorless glasses containing cadmium oxide and boron trioxide. In another aspect the invention relates to a method of making luminescent materials by crystallization of cadmium borate crystals from a glass containing CdO, $B_2O_3$ and manganese oxide.

It has been found that glasses consisting essentially of cadmium oxide, boron trioxide and manganese oxide can be melted and formed and that thereafter crystals can be formed from the glass by thermal crystallization in situ, said crystals being dispersed in the remaining glassy matrix, to yield a coherent product which is luminescent, for instance, when irradiated with ultraviolet rays. However, it was found that the glasses were undesirably colored purple or purplish brown and that the luminescent product of thermal crystallization was also undesirably of a purple color. Furthermore, the luminescent light output was not as high as desired.

It is therefore an object of the invention to provide a method for making a thermally crystallizable substantially colorless glass containing CdO, $B_2O_3$ and manganese oxide, which glass is substantially colorless. Another object of the invention is to provide a method for making an improved luminescent ceramic material from such a glass.

A further object of the invention is to provide a substantially colorless glass containing CdO, $B_2O_3$ and MnO.

Still another object of the invention is to provide a new and improved luminescent ceramic material.

According to one aspect of the invention there is provided a method of making a luminescent ceramic product consisting essentially of a multiplicity of crystals of a cadmium borate dispersed in a glassy matrix. The method comprises melting batch materials and forming a glass consisting essentially of CdO, $B_2O_3$ and MnO in an amount from a trace to 3 weight percent of the glass, the melting and glass formation being carried out under conditions effective to reduce manganese oxide in the glass melt to MnO, so that a substantially colorless glass is obtained; thereafter, the glass, previously formed into any desired shape or configuration, is heated at a crystallization temperature above its annealing point temperature until a desired proportion of cadmium borate crystals are crystallized in situ from the glass.

For best results the ratios of CdO to $B_2O_3$ are chosen from the homogeneous glass formation region of the primary phase diagram. Thus, the glass starting material consists essentially of CdO and $B_2O_3$, in a weight ratio of CdO to $B_2O_3$ from 70/30 to 54/46, plus MnO in an amount from a trace to 3 weight percent of the glass. It is usually preferred that at least 0.01 weight percent of MnO be present in the glass.

As stated, the thermally crystallizable essentially colorless glasses of the invention yield, upon thermal crystallization, luminescent ceramic materials of improved luminosity as compared with similar materials prepared from unreduced colored glasses. The luminescent ceramic materials contain at least 1 host crystal selected from $3CdO \cdot 2B_2O_3$ and $2CdO \cdot 3B_2O_3$. The products of the invention often contain both of these luminescent crystals.

It is essential in the methods of the invention that the formation of the glass melt be effected under conditions which will reduce manganese oxides to MnO. It does not now appear that it is important what method of reduction is employed. Thus the melting and glass formation can be carried out using a reducing atmosphere, or reducing agents can be included in the batch materials for the melt. Such materials can be carbonaceous materials such as carbon or organic compounds which are essentially all consumed during the melting and forming and do not appear in the glass composition. It is also possible to use well-known metallic compound reducing agents but in most instances at least part of the metallic compounds become part of the glass composition in the form of their oxides, and care must be taken to choose such a reducing agent that does not deleteriously affect or quench the luminescence.

In any case, the reduction must be effected with enough reducing agent using sufficient time so that the resulting glass is substantially colorless. It is not possible to specify any particular conditions which will bring about such a result, but optimum amounts of reducing agents and heating times during melting can easily be determined by routine tests.

The following illustrative example of the invention illustrates the principles thereof:

A glass of the weight percent composition 67.95 CdO, 31.97 $B_2O_3$, 0.08 MnO was made in a reducing atmosphere by melting in a gas-fired furnace for about 30 minutes at 1980° F. Also, 0.17 gram of charcoal were included in the batch per 100 grams of CdO+$B_2O_3$+MnO. The batch materials were the special high purity luminescent grade $CdCO_3$ and $MnCO_3$ and analytical reagent grade $H_3BO_3$. From the melt a patty was cast and, after cooling, the resulting colorless and clear glass was heat treated to cause partial in situ crystallization by heating for about 4 hours at 1350° F. The resulting luminescent material comprised a multiplicity of crystals of both $3CdO \cdot 2B_2O_3$ and $2CdO \cdot 3B_2O_3$, was crystallized throughout and was white in color. The test for light output was carried out by measuring the brightness with a model SB 1½ Spectra Brightness Spot Meter, manufactured by Photo Research Corp., Hollywood, California. This meter measures the light output in the visible range from 4000–7000 A. Irradiation was with a 2537 ultraviolet lamp. Irradiation was the same for this example and the other examples to be described herein. That is, the same UV light source was positioned in the same manner so that the exciting radiation received by each sample was the same. The Spectra Brightness Spot Meter measures foot-lamberts, and in this example the light output was 15 foot lamberts under the conditions of the test.

A series of glasses was similarly prepared except that no carbon reducing agent was included and a melting atmosphere ineffective to reduce the MnO was employed, that is, either an air or an oxygen-containing atmosphere. One of the glasses contained the same amount of manganese oxide activator, expressed as MnO, while in other runs increasing amounts of activator were employed. Furthermore, crystallization heat treatment temperatures were varied in an attempt to increase the light output and find the optimum temperature of crystallization. The amounts of manganese oxide varied from 0.08 to 2.53 weight percent, while the crystallization temperatures ranged from 1075 to 1425° F. The best result that was obtained was an output of 10.5 foot-lamberts with a glass containing 67.9 weight percent CdO, 31.9 parts by weight $B_2O_3$ and 0.25 parts by weight manganese oxide expressed as MnO, and a crystallization temperature of 1240° F. In all cases the glasses were purple and the ceramic products were opaque purple.

In another example of the invention a glass of the composition 67.67 weight percent CdO, 31.85 weight percent $B_2O_3$ and 0.48 weight percent MnO was melted and formed in exactly the same manner as the first example described herein, except that 0.57 gram of carbon per 100 grams of $CdO+B_2O_3+MnO$ was employed. The glass was heat treated for crystallization exactly as in the first example and the light output measured and found to be 15 foot lamberts. Again, the glass was colorless and clear, and the luminescent ceramic material was white.

The invention can be employed to make various articles where luminescent materials are used. For instance, the glasses can be used to make fluoroescent lamp containers which are then crystallized to change the glass to the described luminescent material. The glasses can also be ground to powders and then used to make screens in the conventional manner, after which the powdered particles in the form of the screen can be crystallized to form a luminescent screen. On the other hand, the luminescent ceramic material of the invention can be ground to powders and then employed in the usual manner in devices employing conventional sintered cadmium borate luminescent crystalline powders.

The luminescent ceramic materials of the invention have various advantageous properties because of having been crystallized in situ from a glass. Thus, the luminescent crystals are formed in intimate physical and optical contact with the glassy matrix. If a sheet of the semi-crystalline material is to be employed as such the optical contact is important, because there is a reduced light scattering due to the small change in the index of refraction from the crystalline interface to the glass, as compared to conventional screens where the crystal interface is in contact with air or other gas. Also, the glass matrix gives the products a chemical and physical protection. In particular, when the crystalline material is to be ground to form powdered phosphors the glass protects the crystals from serious mechanical damage.

By the term "a glass consisting essentially of" as used in the claims hereafter is meant a glass prepared by fusion of raw glass-making materials and containing the ingredients set forth in the claims but not containing unnamed ingredients which change or materially affect the basic and novel characteristics of the glass. The term, of course, excludes constituents which are poisons for luminescence of the subsequently crystallized materials if they are present in such amounts as substantially eliminate such luminescence. The term also excludes such amounts of glass modifying ingredients, such as metal oxides, that essentially prevent the desired crystallization taking place to form the luminescent ceramic bodies of the invention.

As will be evident to those skilled in the art, various modifications of this invention can be made or followed in the light of the foregoing disclosure and discussion without departing from the spirit and scope of the disclosure or from the scope of the claims.

I claim:

1. A method of making a luminescent ceramic product consisting essentially of a multiplicity of crystals of a cadmium borate dispersed in a glassy matrix, which comprises melting batch materials and forming a glass consisting essentially of CdO, $B_2O_3$ and MnO in an amount from a trace to 3 weight percent of said glass, said melting and glass formation being effected under reducing conditions effective for reducing manganese oxides to MnO so that a substantially colorless glass is obtained; heating said glass at a crystallization temperature above its annealing point temperature until a desired proportion of crystalline material comprising cadmium borate crystals selected from the group consisting of $3CdO \cdot 2B_2O_3$ and $2CdO \cdot 3B_2O_3$ are crystallized in situ from said glass, thereby producing said ceramic product of the foregoing description.

2. A method of making a luminescent ceramic product consisting essentially of a multiplicity of crystals of a cadmium borate dispersed in a glassy matrix, which comprises melting batch materials and forming a glass consisting essentially of CdO and $B_2O_3$, in a weight ratio of CdO to $B_2O_3$ from 70/30 to 54/46, plus MnO in an amount from a trace to 3 weight percent of said glass, said melting and glass formation being effected under reducing conditions effective for reducing manganese oxides to MnO that a substantially colorless glass is obtained; heating said glass at a crystallization temperature above its annealing point temperature until a desired proportion of crystalline material comprising cadmium borate crystals selected from the group consisting of $3CdO \cdot 2B_2O_3$ and $2CdO \cdot 3B_2O_3$ are crystallized in situ from said glass, thereby producing said ceramic product of the foregoing description.

3. A luminescent ceramic material consisting essentially of a multiplicity of crystals of at least one cadmium borate selected from the group consisting of $3CdO \cdot 2B_2O_3$ and $2CdO \cdot 3B_2O_3$ dispersed in a glassy matrix, the said crystals having been formed by crystallization in situ from a substantially colorless glass consisting essentially of CdO, $B_2O_3$ and MnO, the weight ratio of CdO to $B_2O_3$ being from 70/30 to 54/46, said glass containing from 0.01 to 3 weight percent MnO.

References Cited by the Examiner

UNITED STATES PATENTS

| 2,241,951 | 5/1941 | Huniger et al. | 252—301.4 |
|---|---|---|---|
| 2,270,124 | 1/1942 | Huniger et al. | 252—301.4 |
| 2,400,147 | 5/1946 | Hooley | 252—301.6 |
| 2,477,649 | 8/1949 | Pincus | 106—47 |
| 2,582,081 | 1/1952 | Kuan-Han Sun et al. | 106—47 |
| 2,920,046 | 1/1960 | Ranby | 252—301.6 |
| 2,965,579 | 12/1960 | Cox et al. | 252—301.6 |
| 3,020,238 | 2/1962 | Munakata | 252—301.6 |

OTHER REFERENCES

Kroger, "Some Aspects of the Luminescence of Solids," Elsevier Pub. Co. Inc., New York, 1948, pages 60, 61 and 270.

TOBIAS E. LEVOW, *Primary Examiner.*

MAURICE A. BRINDISI, *Examiner.*